US008684563B2

(12) United States Patent
Lin et al.

(10) Patent No.: US 8,684,563 B2
(45) Date of Patent: Apr. 1, 2014

(54) HEAT DISSIPATING STRUCTURE OF LED LAMP CUP MADE OF POROUS MATERIAL

(75) Inventors: Kuo-Len Lin, Wugu Township, Taipei County (TW); Chen-Hsiang Lin, Wugu Township, Taipei County (TW); Hwai-Ming Wang, Wugu Township, Taipei County (TW); Chiao-Li Huang, Wugu Township, Taipei County (TW); Ken Hsu, Wugu Township, Taipei County (TW); Chih-Hung Cheng, Wugu Township, Taipei County (TW)

(73) Assignee: Kitagawa Holdings, LLC, Wilmington, DE (US)

( * ) Notice: Subject to any disclaimer, the term of this patent is extended or adjusted under 35 U.S.C. 154(b) by 395 days.

(21) Appl. No.: 12/345,976

(22) Filed: Dec. 30, 2008

(65) Prior Publication Data

US 2010/0165630 A1 Jul. 1, 2010

(51) Int. Cl.

| | |
|---|---|
| ***F21V 29/00*** | (2006.01) |
| ***F21V 5/00*** | (2006.01) |
| ***F21V 3/00*** | (2006.01) |
| ***B60Q 1/06*** | (2006.01) |

(52) U.S. Cl.

USPC ....... 362/294; 362/311.02; 362/264; 362/373

(58) Field of Classification Search

USPC ............................ 362/311.02, 294, 264, 373

See application file for complete search history.

(56) References Cited

U.S. PATENT DOCUMENTS

| | | | | |
|---|---|---|---|---|
| 5,871,346 | A * | 2/1999 | Stephenson | 431/365 |
| 7,396,146 | B2 * | 7/2008 | Wang | 362/294 |
| 7,401,643 | B2 * | 7/2008 | Queheillalt et al. | 165/104.21 |
| 7,505,268 | B2 * | 3/2009 | Schick | 361/700 |
| 7,517,133 | B2 * | 4/2009 | Han et al. | 362/632 |
| 7,628,513 | B2 * | 12/2009 | Chiu | 362/311.02 |
| 7,631,987 | B2 * | 12/2009 | Wei | 362/294 |
| 7,800,119 | B2 * | 9/2010 | He et al. | 257/79 |
| 8,164,237 | B2 * | 4/2012 | Wen | 313/46 |
| 2002/0108743 | A1 * | 8/2002 | Wirtz | 165/185 |
| 2005/0169006 | A1 * | 8/2005 | Wang et al. | 362/555 |
| 2007/0230186 | A1 * | 10/2007 | Chien | 362/294 |
| 2007/0230188 | A1 * | 10/2007 | Lin | 362/294 |
| 2008/0007953 | A1 * | 1/2008 | Keller et al. | 362/294 |
| 2008/0112168 | A1 * | 5/2008 | Pickard et al. | 362/247 |
| 2009/0219728 | A1 * | 9/2009 | Hata et al. | 362/382 |
| 2009/0244899 | A1 * | 10/2009 | Chyn | 362/294 |

* cited by examiner

*Primary Examiner* — David J Makiya

(74) *Attorney, Agent, or Firm* — Baker & Hostetler LLP

(57) ABSTRACT

A heat dissipating structure of a lightweight lamp cup 10 made of a porous material includes a containing cavity 11 at an end of the lamp cup 10, a lamp holder 30 at another end of the containing cavity 11, a metal hood 60 sheathed with the lamp holder 30 and covered onto an external side of the lamp cup 10, a heat conduction medium 50 between the lamp cup 10 and the metal hood 60, and a light emitting unit 20 contained in the containing cavity 11 of the lamp cup 10, such that the heat produced by the light emitting unit 20 can be conducted form the lamp cup 10 to the metal hood 60 and dissipated from the metal hood 60 to the outside.

8 Claims, 5 Drawing Sheets

HEAT DISSIPATING STRUCTURE OF LED LAMP CUP MADE OF POROUS MATERIAL

BACKGROUND OF THE INVENTION

1. Field of the Invention

The present invention generally relates to an illumination device, and more particularly to a lightweight light emitting diode (LED) lamp.

2. Description of Prior Art

A general illumination device such as a projection lamp, a road lamp or any other lamp usually comes with a lamp cup manufactured by an aluminum extrusion molding method, and a containing space is formed at the lamp cup for installing a light emitting unit therein, so that light emitted from the light emitting unit can be reflected and/or refracted to provide a light source required in a certain specific area.

If the light emitting unit of the aforementioned illumination device is a high-brightness light emitting body, a heat dissipating device is usually installed to dissipate the high heat produced by the light emitting unit during the light emission to prevent shortening the life of the light emitting unit due to the high heat or increasing the costs of maintenance, repair and use.

The conventional lamp cup is made of a material such as aluminum with a higher coefficient of thermal conductivity, and whose lamp cup and heat dissipating fin are manufactured by an aluminum extrusion method, so that the high heat produced by the light emitting unit can be dissipated. However, if the lamp cup is used for a larger lamp, the total weight of the lamp manufactured by the aluminum extrusion method is heavy, and the aluminum metal has a high cost, and thus the conventional lamp cup incurs a higher manufacturing cost.

In view of the foregoing shortcomings of the prior art, the inventor of the present invention based on years of experience in the related industry to conduct extensive researches and experiments, and finally developed a feasible design to overcome the foregoing shortcomings of the prior art.

SUMMARY OF THE INVENTION

It is a primary objective of the present invention to provide a heat dissipating structure of a lamp cup made of a porous material, and the lamp cup is made of a porous material, such that the structure with the porous material can be used for reducing the weight of the lamp cup, and the material having a high thermal conductivity is used for conducting the heat produced by a light emitting unit.

Another objective of the present invention is to provide a heat dissipating structure of a lamp cup made of a porous material, and the lamp cup is made of a lower priced porous material to reduce the manufacturing cost of the lamp cup.

To achieve the foregoing objectives, the present invention provides a heat dissipating structure of a lamp cup made of a porous material, and the structure comprises a lamp cup made of a porous material, a containing cavity disposed at an end of the lamp cup, a lamp holder covered onto another end of the containing cavity, a metal hood sheathed to the lamp holder and covered onto an external side of the lamp cup, and a heat conduction medium disposed between the lamp cup and the metal hood, such that a light emitting unit is contained and installed in the containing cavity of the lamp cup, and the heat produced by a light emitting unit can be conducted from the lamp cup to the metal hood and dissipated from the metal hood to the outside.

Compared with the prior art, the present invention is characterized in that the lamp cup is made of a porous material, and the structure made of the porous material can reduce the weight of the lamp cup, and the price of the porous material is lower than those made by aluminum extrusion, and thus incurs a lower manufacturing to improve the practicability and cost-effectiveness of the present invention.

DETAILED DESCRIPTION OF THE INVENTION

The technical characteristics, features and advantages of the present invention will become apparent in the following detailed description of preferred embodiments with reference to the accompanying drawings, and the preferred embodiments are used for illustrating the present invention only, but not intended to limit the scope of the invention.

Figure 1:
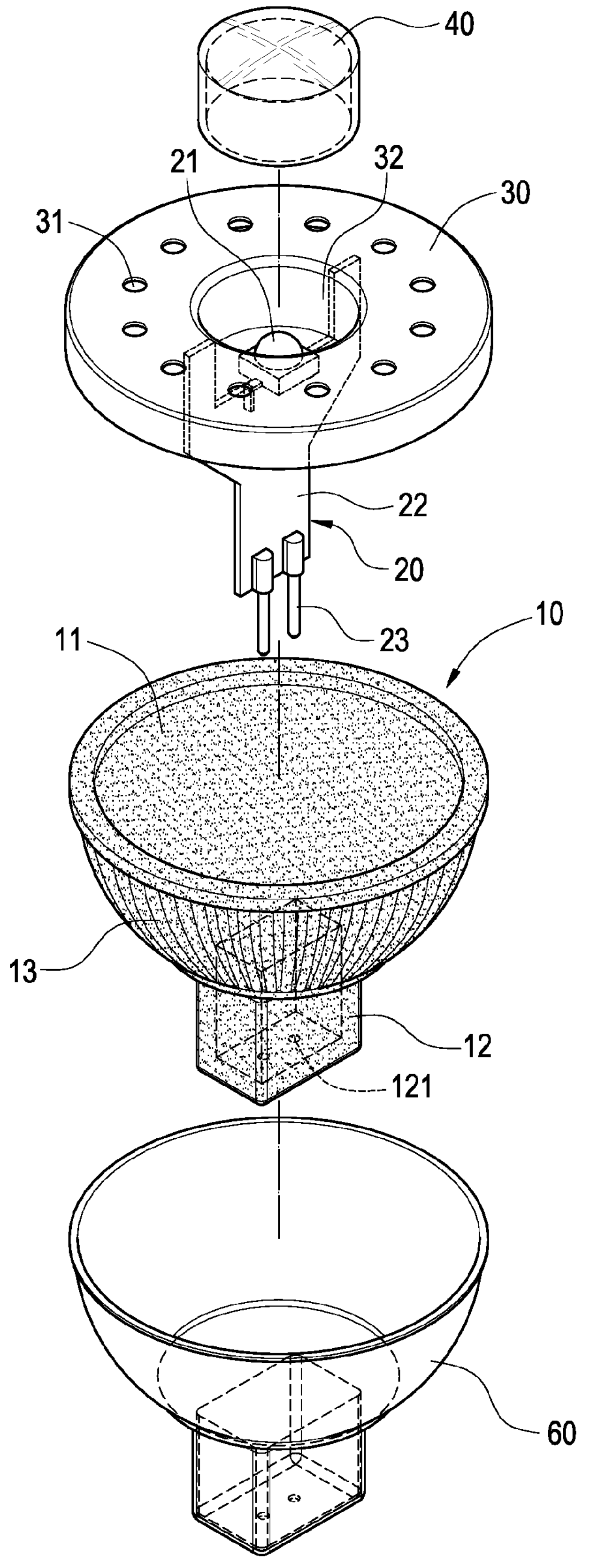
FIG. 1 is an exploded view of a heat dissipating structure of a lamp cup made of a porous material in accordance with a preferred embodiment of the present invention.
Figure 2:
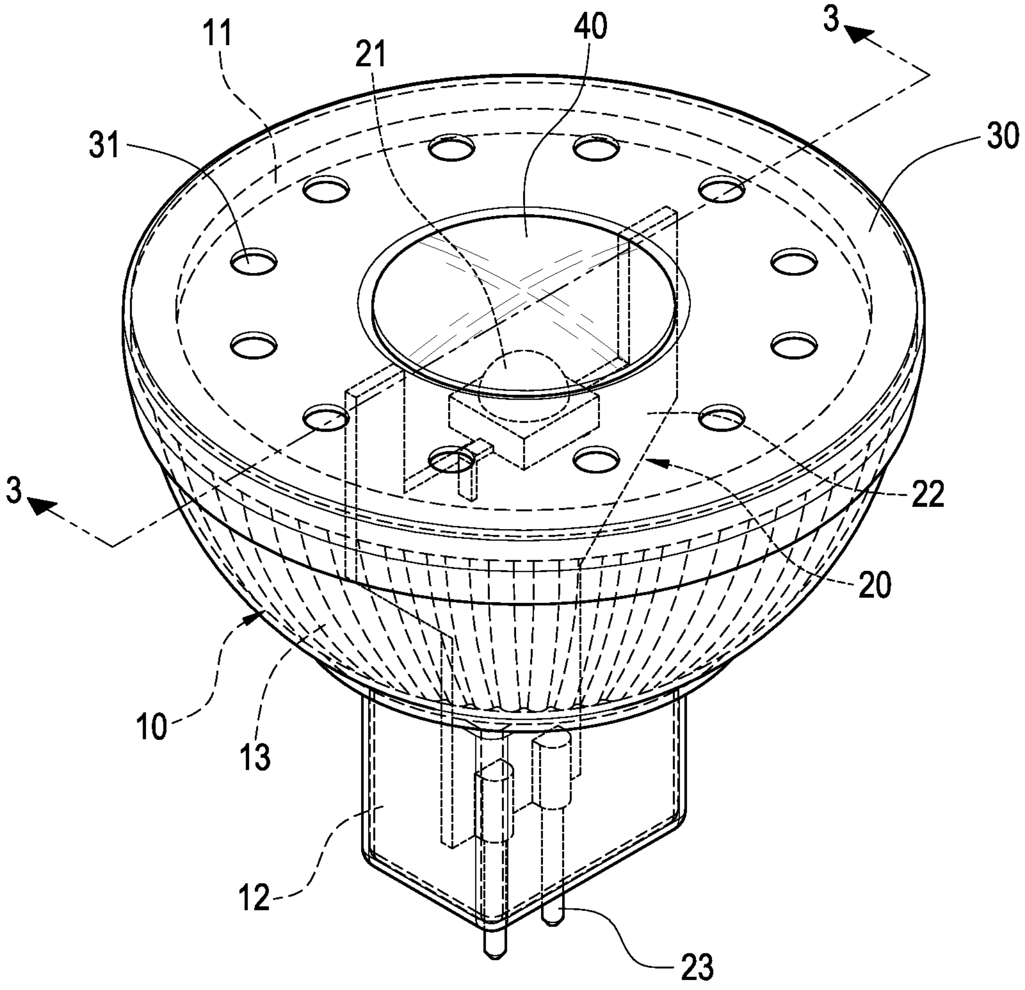
FIG. 2 is a perspective view of a heat dissipating structure of a lamp cup made of a porous material in accordance with a preferred embodiment of the present invention.
Figure 3:
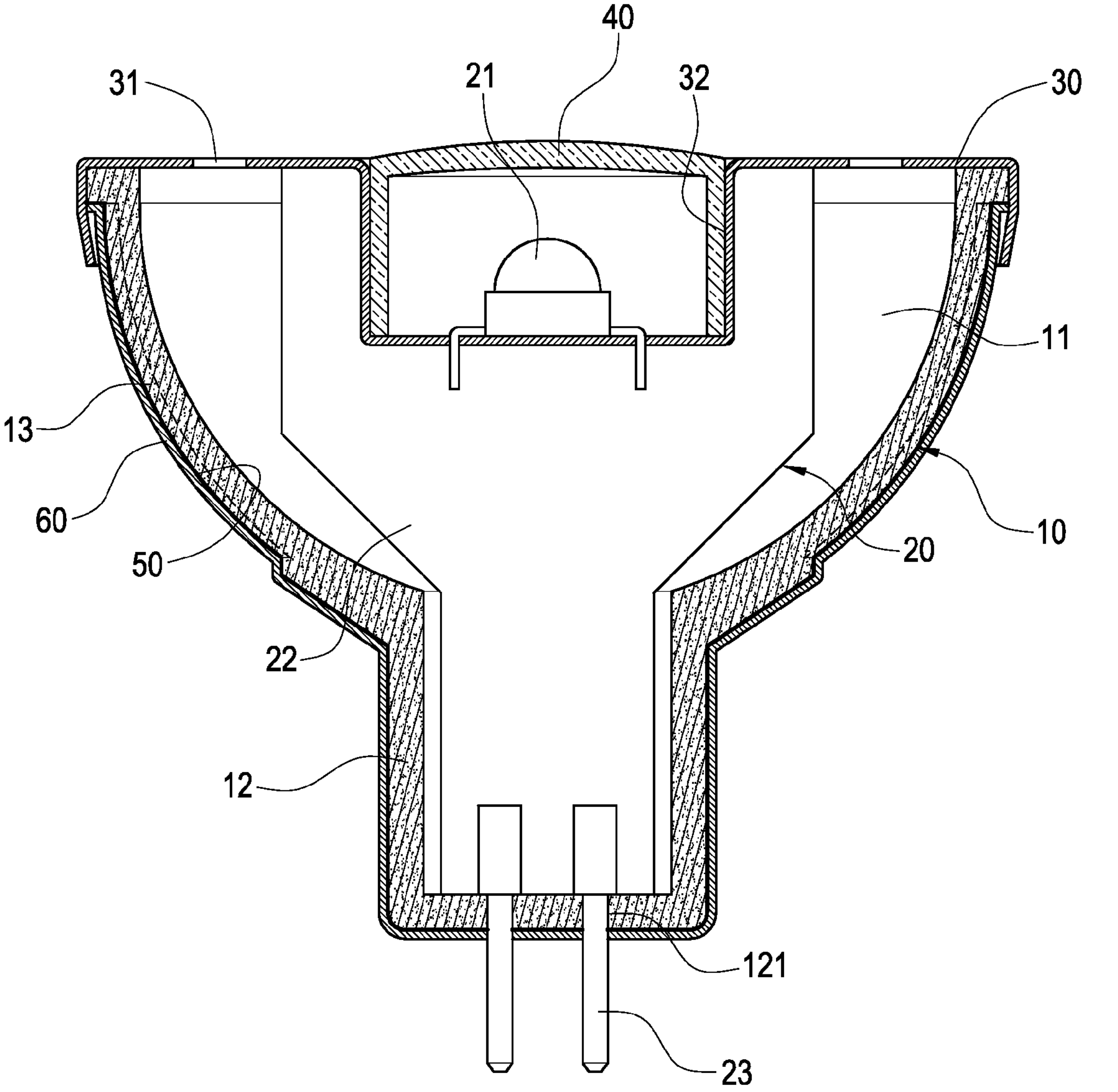
FIG. 3 is a cross-sectional view of Section 3-3 as depicted in FIG. 2.

With reference to FIGS. 1 to 3 for an exploded view, a perspective view and a cross-sectional view of a heat dissipating structure of a lamp cup made of a porous material in accordance with the present invention respectively, and the structure comprises a lamp cup 10 made of a porous material such as silicon carbide, graphite or ceramic, and the structure made of the porous material can reduce the weight of the lamp cup 10. In addition, the material comes with a high thermal conductivity for facilitating the heat conduction.

The lamp cup 10 has a containing cavity 11 disposed at an end of the lamp cup 10, a base 12 disposed at another end of the lamp cup 10, a light emitting unit 20 contained in the containing cavity 11, and a through hole 121 disposed at the base 12. In this preferred embodiment, the lamp cup 10 has a substantially bowl-shaped cross section and includes a plurality of ribs 13 disposed on an external surface of the lamp cup 10. Of course, the invention is not limited to the aforementioned arrangement only, but any other equivalent arrangement can be adopted instead. The light emitting unit 20 is an LED module installed on a circuit board 22 of an LED lamp 21, and the light emitting unit 20 includes a connecting end 23 for passing through the through hole 121 of the base 12 and connecting a power supply to supply the required power to the light emitting unit 20.

A lamp holder 30 is covered onto another end of the containing cavity 11 of the lamp cup 10, and a plurality of heat dissipating holes 31 are disposed on a surface of the lamp holder 30 in this embodiment for facilitating the heat dissipation of the lamp cup 10, and the lamp holder 30 forms a containing space 32 corresponding to the containing cavity 11 of the lamp cup 10, and the containing space 32 is provided for installing the LED lamp 21. In addition, the lamp holder 30 is coupled to a light transmitting body 40, and the light transmitting body 40 is provided for refracting the light emitted from the light emitting unit 20.

In FIG. 3, a heat conduction medium 50 is disposed on a surface of the lamp cup 10, wherein the heat conduction medium 50 is a highly conductive matter such as copper or tin sprayed or coated on an external surface of lamp cup 10 for quickly conducting the heat absorbed by the lamp cup 10.

A metal hood 60 is sheathed and coupled to the lamp holder 30 for covering the external side of the lamp cup 10, wherein the metal hood 60 is a hood made of a metal such as copper or aluminum with a good heat dissipating property and provided for protecting the lamp cup 10. Since the lamp cup 10 is made of a porous material, it has the advantages of a light weight and a low price, but it is also fragile. The metal hood 60 sheathed and covered onto the lamp cup 10 can prevent the lamp cup 10 from being broken or cracked easily. In addition, the metal hood 60 can prevent external moisture from entering or damaging components inside the lamp cup 10.

In an assembling process, the light emitting unit 20 is installed to the lamp holder 30, and the lamp holder 30 is covered onto the lamp cup 10 that is coated with the heat conduction medium 50 for accommodating the light emitting unit 20 in the lamp cup 10, and the semi-finished good is sheathed into the metal hood 60, such that the metal hood 60 and the lamp holder 30 are coupled with each other and covered onto the external side of the lamp cup 10, wherein the lamp cup 10 has a plurality of ribs 13 on its external surface for facilitating an attachment onto an internal wall of the aluminum hood 60, and a connecting end 23 of the light emitting unit 20 is passed through the through hole 121 of the base 12 of the lamp cup 10 and the metal hood 60 to connect an external power supply (not shown in the figure).

Figure 4:
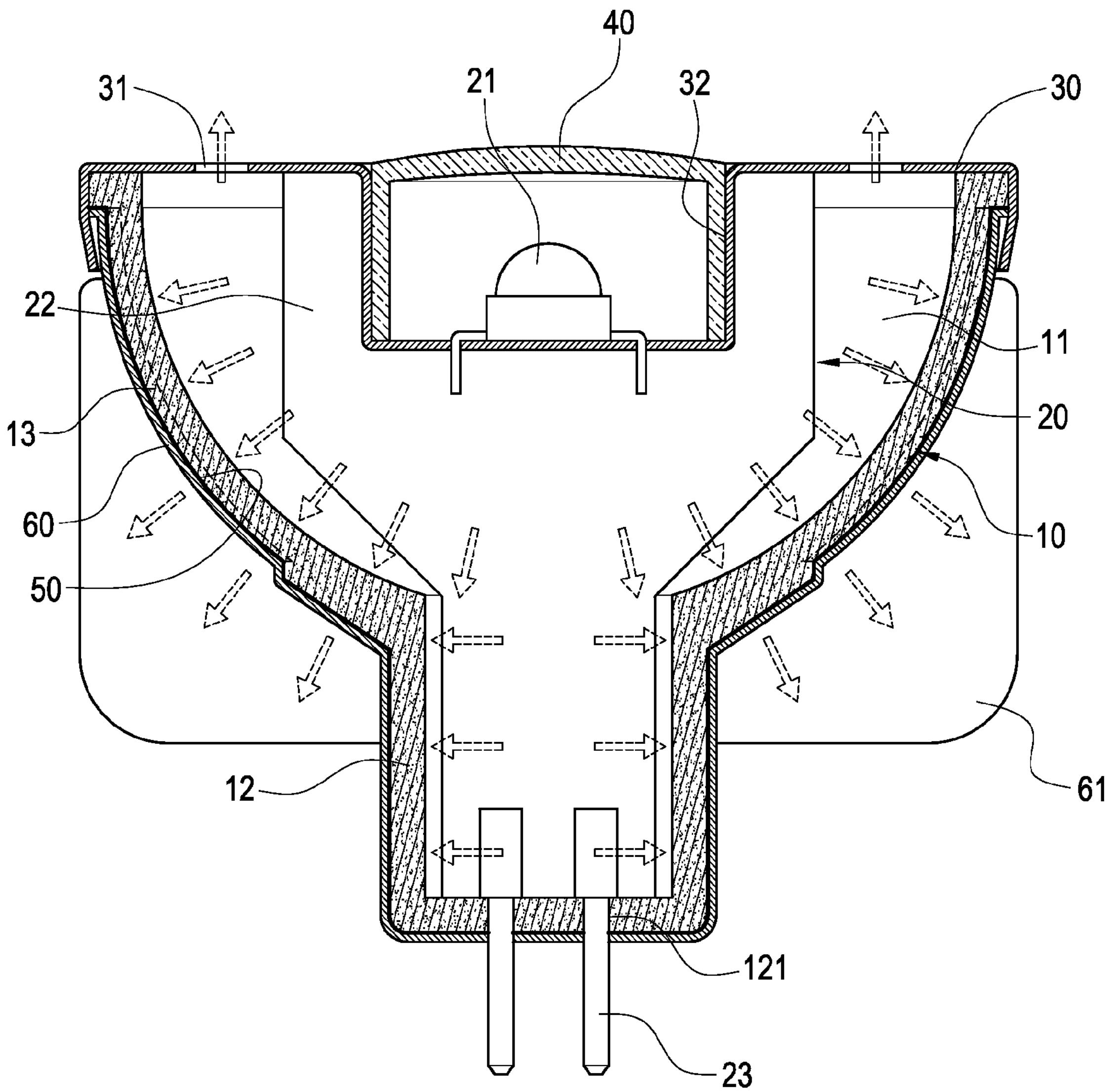
FIG. 4 is a schematic view of using a heat dissipating structure of a lamp cup made of a porous material in accordance with a preferred embodiment of the present invention.

With reference to FIG. 4 for a schematic view of using a lamp cup made of a porous material in accordance with the present invention, a plurality of heat dissipating fins 14 are formed on a surface of the metal hood 60 for expanding the heat dissipating area of the metal hood 60, wherein a portion of the heat produced by the light emitting unit 20 is disposed from the heat dissipating holes 31 on the surface of the lamp holder 30, and another large portion of the heat is absorbed by the lamp cup 10, conducted from the heat conduction medium 50 to the metal hood 60, and dissipated quickly to the outside by the metal hood 60 and its heat dissipating fins 61.

Figure 5:
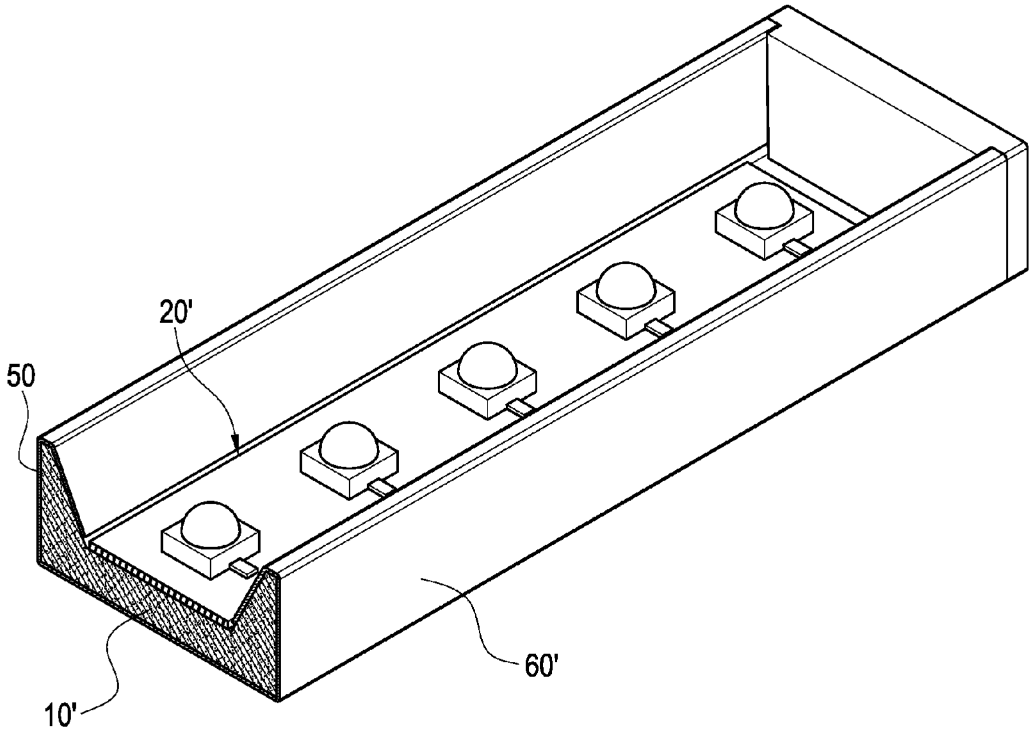
FIG. 5 is a schematic view of a heat dissipating structure of a lamp cup made of a porous material in accordance with another preferred embodiment of the present invention.

With reference to FIG. 5 for a lamp cup made of a porous material in accordance with another preferred embodiment of the present invention, this embodiment is substantially the same as the previous embodiment, and the difference resides on that the lamp cup 10' of this embodiment has a substantially U-shaped cross section, and a heat conduction medium 50 is disposed on an external surface of the lamp cup 10', and a light emitting unit 20' is contained in the lamp cup 10', and an aluminum hood 60' is sheathed and covered onto an external side of the lamp cup 10', and the aluminum hood 60' is a hood made of aluminum and formed with a shape corresponding to the shape of the lamp cup 10'. In this embodiment, the lamp cup 10' is not covered onto the lamp holder to show a clear appearance, and the lamp cup 20' is covered onto a lamp holder for sealing the light emitting unit 10' therein.

While the invention has been described by means of specific embodiments, numerous modifications and variations could be made thereto by those skilled in the art without departing from the scope and spirit of the invention set forth in the claims.

What is claimed is:

1. A heat dissipating structure for dissipating heat produced by a light emitting unit, comprising:

a lamp cup comprising a porous material and having a containing cavity and a base extending from the containing cavity;

a lamp holder disposed in the containing cavity to cover the containing cavity, the lamp holder having a containing space for containing a lamp of the light emitting unit;

a heat conduction medium on an external surface of the containing cavity and the base of the lamp cup;

a metal hood covering an entire external side of the containing cavity and an external surface of the base of the lamp cup so that the metal hood and the lamp holder are coupled with each other to sheathe the lamp cup; and a light transmitting body installed in the containing space for refracting light emitted from the lamp of the light emitting unit, a top surface of the light transmitting body being substantially at the same level with a top surface of the lamp holder.

2. The heat dissipating structure as recited in claim 1, further comprising a plurality of heat dissipating holes disposed on a surface of the lamp holder for facilitating the heat dissipation of the lamp cup.

3. The heat dissipating structure as recited in claim 1, wherein the light emitting unit has a connecting end and the base has a through hole for the connecting end of the light emitting unit.

4. The heat dissipating structure as recited in claim 1, wherein the lamp cup has a plurality of ribs disposed on a surface of the lamp cup and attached onto an internal wall of the metal hood.

5. The heat dissipating structure as recited in claim 1, wherein the lamp cup has a substantially bowl-shaped cross section.

6. The heat dissipating structure as recited in claim 1, wherein the lamp cup has a substantially U-shaped cross-section.

7. The heat dissipating structure as recited in claim 1, wherein the heat conduction medium comprises tin.

8. The heat dissipating structure as recited in claim 1, wherein the metal hood comprises one of copper or aluminum.

* * * * *